(12) United States Patent
Gupta et al.

(10) Patent No.: US 10,120,905 B2
(45) Date of Patent: Nov. 6, 2018

(54) EFFICIENT DETERMINATION OF JOIN PATHS VIA CARDINALITY ESTIMATION

(71) Applicant: Amazon Technologies, Inc., Seattle, WA (US)

(72) Inventors: Anurag Windlass Gupta, Atherton, CA (US); Timothy Andrew Rath, Des Moines, WA (US); Srinivasan Sundar Raghavan, Mercer Island, WA (US); Santosh Kalki, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 600 days.

(21) Appl. No.: 14/578,841

(22) Filed: Dec. 22, 2014

(65) Prior Publication Data

US 2016/0179894 A1   Jun. 23, 2016

(51) Int. Cl.
*G06F 7/00* (2006.01)
*G06F 17/30* (2006.01)

(52) U.S. Cl.
CPC .. *G06F 17/30498* (2013.01); *G06F 17/30581* (2013.01)

(58) Field of Classification Search
CPC ......... G06F 17/30498; G06F 17/30595; G06F 17/30581
See application file for complete search history.

(56) References Cited

U.S. PATENT DOCUMENTS

| | | | |
|---|---|---|---|
| 5,675,714 A | 10/1997 | Kato | |
| 6,374,263 B1 | 4/2002 | Bunger et al. | |
| 7,620,615 B1 * | 11/2009 | Milby | G06F 17/30433 |
| 7,630,967 B1 * | 12/2009 | Srivastava | G06F 17/30442 |
| 7,908,242 B1 | 3/2011 | Achanta | |
| 8,788,506 B1 * | 7/2014 | Dornbach | G06F 17/30864 707/747 |
| 2005/0278357 A1 | 12/2005 | Brown et al. | |
| 2006/0020582 A1 | 1/2006 | Dettinger et al. | |
| 2007/0233644 A1 * | 10/2007 | Bakalash | G06F 17/30457 |
| 2008/0033907 A1 * | 2/2008 | Woehler | G06F 17/30439 |

(Continued)

FOREIGN PATENT DOCUMENTS

| | | |
|---|---|---|
| EP | 1804178 A1 | 7/2007 |
| JP | H09034759 A | 2/1997 |

(Continued)

OTHER PUBLICATIONS

International Patent Application No. PCT/US2015/067186; Int'l Search Report and the Written Opinion; dated Apr. 26, 2016; 10 pages.

(Continued)

*Primary Examiner* — Hasanul Mobin
(74) *Attorney, Agent, or Firm* — Davis Wright Tremaine LLP

(57) ABSTRACT

A probabilistic counting structure such as a hyperloglog may be formed during a table scan for each of a selected set of columns. The columns may be selected based on an initial estimate of relatedness, which may be based on data types of the respective columns. An estimated cardinality of an intersection or union of columns may be formed based on an intersection of the probabilistic data structures. A join path may be determined based on the estimated cardinality of an intersection or union of the columns.

20 Claims, 7 Drawing Sheets

(56) References Cited

U.S. PATENT DOCUMENTS

| | | | |
|---|---|---|---|
| 2009/0228433 A1* | 9/2009 | Aguilar Saborit | G06F 17/30489 |
| 2013/0346429 A1* | 12/2013 | Bratz | G06F 17/30557 707/758 |
| 2014/0181074 A1* | 6/2014 | Ghazal | G06F 17/30463 707/714 |
| 2014/0181827 A1* | 6/2014 | Dice | G06F 9/52 718/103 |
| 2014/0258341 A1 | 9/2014 | Mazoue | |
| 2014/0279838 A1* | 9/2014 | Tsirogiannis | G06F 17/30292 707/603 |
| 2015/0039667 A1* | 2/2015 | Shah | H04L 67/1044 709/201 |
| 2015/0120684 A1* | 4/2015 | Bawaskar | G06F 17/30153 707/693 |
| 2015/0269178 A1* | 9/2015 | Rhodes | G06F 17/3089 707/700 |
| 2015/0363443 A1* | 12/2015 | Kaushik | G06F 17/30315 707/723 |

FOREIGN PATENT DOCUMENTS

| | | |
|---|---|---|
| JP | H11003340 A | 1/1999 |
| JP | 2000353163 A | 12/2000 |
| JP | 2004086782 A | 3/2004 |
| JP | 2009523270 A | 6/2009 |
| JP | 2013542478 A | 11/2013 |
| WO | WO 2011/100076 A1 | 8/2011 |

OTHER PUBLICATIONS

International Patent Application No. PCT/US2015/067175; Int'l Search Report and the Written Opinion; dated Apr. 28, 2016; 9 pages.
Singapore Patent Application No. 11201705014T; Written Opinion; dated Sep. 28, 2017; 6 pages.
International Patent Application No. PCT/US2015/067175; Int'l Preliminary Report on Patentability; dated Jul. 6, 2017; 6 pages.
International Patent Application No. PCT/US2015/067186; Int'l Preliminary Report on Patentability; dated Jul. 6, 2017; 7 pages.
Australian Notice of Acceptance for Patent Application dated Jul. 31, 2018, Patent Application No. 2015369723, filed Dec. 21, 2015, 3 pages.
Japanese Decision to Grant dated Jun. 22, 2018, Patent Application No. 2017-533922, filed Dec. 21, 2015, 2 pages.
Japanese Office Action dated Jul. 2, 2018, Patent Application No. 2017-533917, filed Dec. 21, 2015, 3 pages.
Singaporean Notice of Eligibility for Grant and Examination Report dated Aug. 28, 2018, Patent Application No. 11201705014T, filed Dec. 21, 2015, 7 pages.
European Communication pursuant to Article 94(3) EPC dated Jul. 27, 2018, Patent Application No. 15848153.1, filed Dec. 21, 2015, 10 pages.

* cited by examiner

US 10,120,905 B2

EFFICIENT DETERMINATION OF JOIN PATHS VIA CARDINALITY ESTIMATION

BACKGROUND

Data warehouse and online analytical processing ("OLAP") systems may include various tools that allow for automated generation of analytical queries. These tools may, in some cases, rely on a user to supply various details concerning the structure of the data to be analyzed. Providing this information may, however, be an involved process. In other cases, tools may automatically generate analytical queries using explicitly defined schema information, such as primary key and foreign key relationships. However, analytically useful relationships may exist even when not explicitly defined. There may also be analytically useful relationships of which a user of an analytical tool is not aware.

BRIEF DESCRIPTION OF DRAWINGS

The following detailed description may be better understood when read in conjunction with the appended drawings. For the purposes of illustration, various examples of aspects of the disclosure are shown in the drawings; however, the invention is not limited to the specific methods and instrumentalities disclosed.

DETAILED DESCRIPTION

Aspects of the present disclosure may be employed to identify join relationships that may be used to perform analytical operations on transactional data. Join relationships may be utilized for various purposes, such as for generating analytical queries. Join relationships may be used, in some cases, to generate hierarchies usable for performing analytics.

Embodiments of the present disclosure may utilize probabilistic data structures, such as a hyperloglog, to identify join relationships between columns. Embodiments may generate a probabilistic data structure for each potentially related column, where an initial estimate of relatedness may be based on factors such as a common data type. Embodiments may estimate coincidence between column values based on an intersection, or a union based on the intersection, of two or more probabilistic data structures. Coincidence between column values may then be used as a basis for identifying a join relationship between columns.

A probabilistic data structure may include those related to various statistical techniques, such as approximation or randomization, to estimate the cardinality of a set. The cardinality of a data set may refer to the number of distinct values within the set. Examples of a probabilistic data structures include those related to the hyperloglog, loglog, and bloom filter techniques. The terms hyperloglog, loglog, min-hash, and bloom filter may be used to refer to the structure that corresponds to the technique.

A probabilistic data structure may comprise a number of buckets. Each bucket may correspond to a subdivision of a data stream and may contain information pertaining to the estimated cardinality within the subdivision. The data stream may be subdivided based on a variety of criteria. In some cases, the subdivision may be essentially random, in which case the buckets may correspond to essentially random portions of the data set. This might be the case, for example, when the data stream is subdivided using certain hash functions. In other cases, the subdivision may be based on non-random criteria such as a key range.

Typically, the data stream may be obtained by scanning a large (and in some cases very large) data set. A probabilistic data structure may be used to estimate cardinality of large data sets in a memory-efficient manner. The accuracy of the cardinality estimate may, however, depend upon the number of subdivisions in the data stream and the number of corresponding buckets in the probabilistic data structure.

Embodiments may utilize a plurality of probabilistic data structures to form estimates of coincidence between data in a plurality of data streams. As used herein, the term data stream may apply to columnar data from a database management system. Accordingly, embodiments may utilize a plurality of probabilistic data structures to form estimates of coincidence between data in a plurality of data columns.

Figure 1:
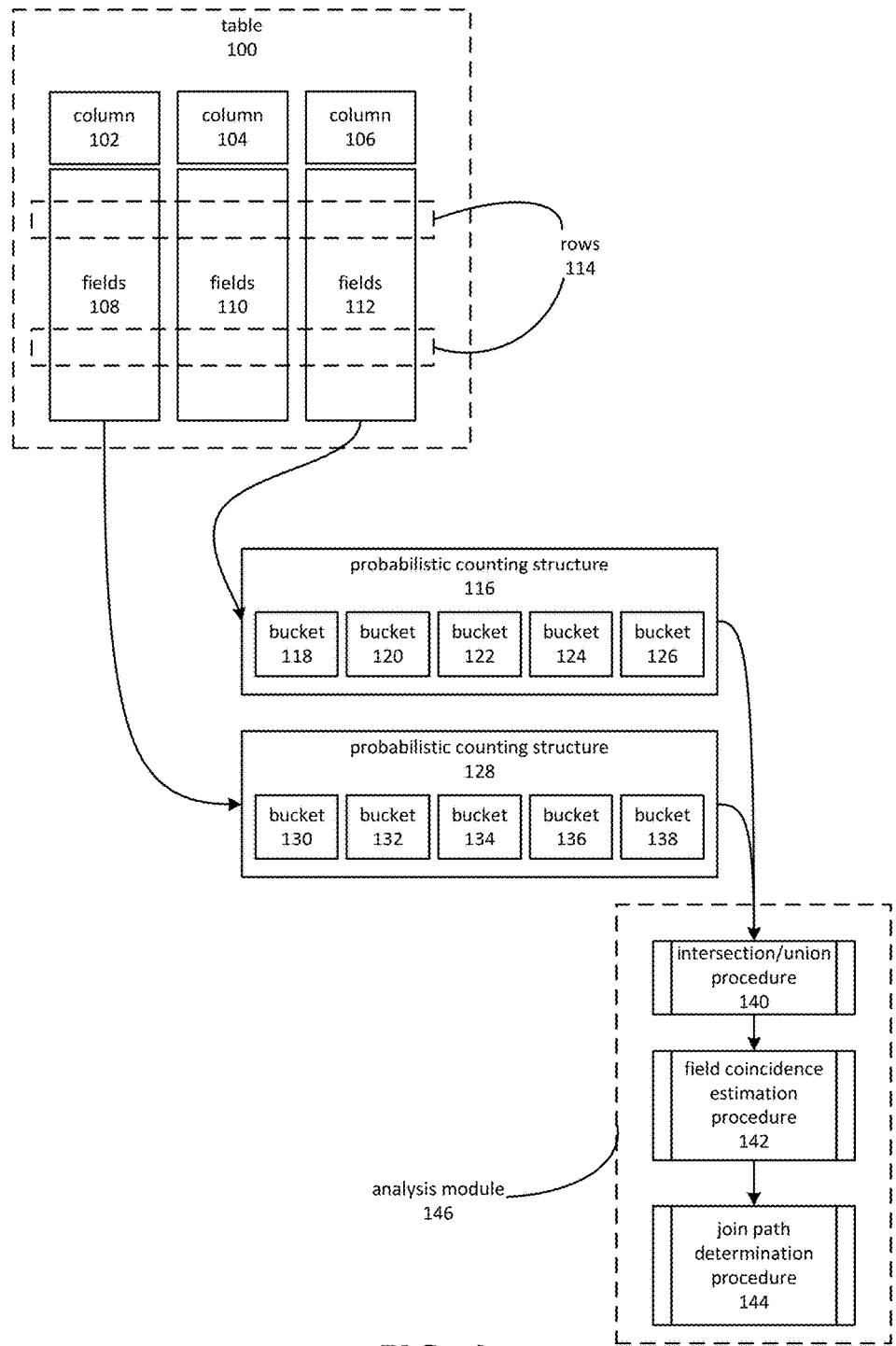
FIG. 1 is a block diagram depicting an embodiment of a system and process for identifying join relationships by using probabilistic counting structures to estimate field coincidence within two columns.

FIG. 1 is a block diagram depicting an embodiment of a system and process for identifying join relationships by using probabilistic counting structures to estimate field coincidence within two columns. A value of a column within a particular row, which may be referred to as a field, may be coincident with another field when both fields have the same value within a row. Embodiments may, based on the frequency of coincidence, determine that a join path exists between the two columns.

In FIG. 1, a table 100 may comprise some number of rows 114. Each row may comprise some number of columns, such as columns 102-106. The intersection of a particular column and a particular row may be described as a field. The term field may be used to describe the intersection of a row and column or to a value at such an intersection. In FIG. 1, fields 108 may correspond to column 102, fields 110 may correspond to column 104, and fields 112 may correspond to column 106. In various embodiments, data for table 100 may be stored on one or more storage devices in a row-oriented format and/or a column-oriented format.

Embodiments may identify certain columns for analysis based on an initial estimate of relatedness. For example, embodiments might determine that column 102 and column 106 are potentially related. An initial estimate may, in some cases, be based on data types. Join paths may be more likely to exist between columns of the same data type, a similar data type, or different data types that may be converted to a common data type. As a non-limiting example, it may be presumed that the depicted columns 102 and 106 are both of the same data type, such as an integer data type.

Probabilistic counting techniques may be utilized to determine the cardinality of values within a particular column. For example, a probabilistic counting structure 116 may be formed for fields 112, and used to provide a cardinality estimate corresponding to column 106. Similarly, probabilistic counting structure 128 may be formed for fields 108, and used to provide a cardinality estimate corresponding to column 102. A cardinality estimate for a column may be indicative of a number of unique values within fields of the column.

A probabilistic counting structure 116 may comprise a number of buckets 118-126. An individual bucket, such as bucket 120, may correspond to the cardinality of a range of values that may be present in fields 112, or to the cardinality of a range of rows in fields 112.

Embodiments may comprise an analysis module 146. The analysis module 146 may include an intersection/union procedure 140 that may calculate an intersection of probabilistic counting structure 116 and probabilistic counting structure 128. Either of these structures may be visualized as vectors. An intersection of the two vectors may comprise a new vector whose elements comprise the intersection of corresponding elements of the two original vectors. For example, an intersection might be calculated as a vector whose five elements comprise the intersection of buckets 118 and 130, buckets 120 and 132, buckets 122 and 134, buckets 124 and 136, and buckets 126 and 138. In FIG. 1, probabilistic counting structures 116 and 128 are depicted as having five buckets each. More or fewer buckets may be utilized in various cases and embodiments.

An analysis module 146 may comprise a field coincidence estimation procedure 142. Estimating field coincidence may involve utilizing the intersection of the probabilistic data structures 116 and 128. The intersection may, for example, be used to determine an estimate of the cardinality of a union of fields 108 and 112, using an inclusion-exclusion principle.

Embodiments may utilize the estimated cardinality of a union of fields 108 and 112. A join path determination procedure 144, which analysis module 146 may comprise, may identify a join path between column 102 and column 106 based on the estimated cardinality of the union, or on the intersection without determining the union.

Figure 2:
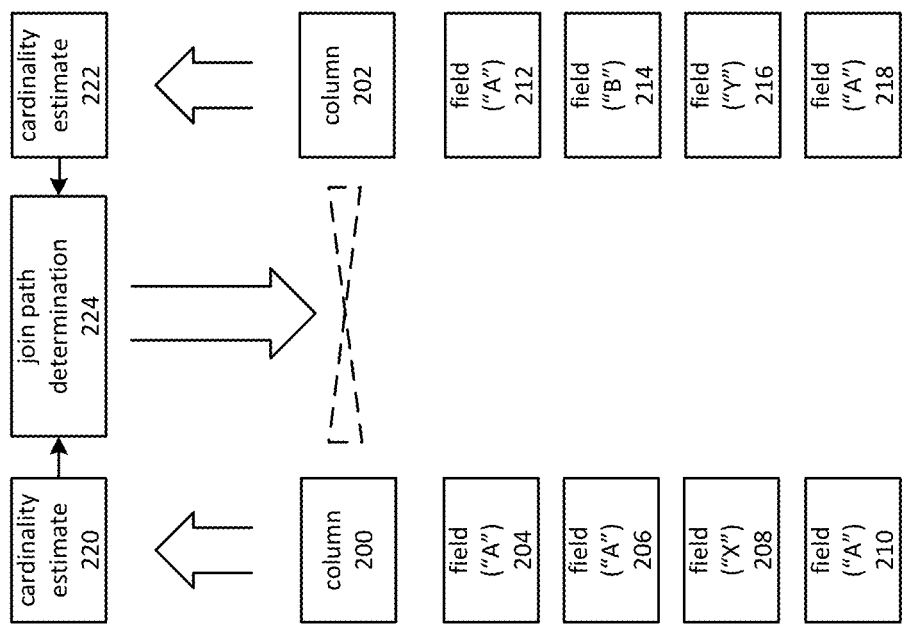
FIG. 2 is a block diagram depicting identification of a join path between two columns based on estimated field coincidence calculated using cardinality estimates.

FIG. 2 is a block diagram depicting identification of a join path between two columns based on estimated field coincidence calculated using cardinality estimates. A column 200 and a column 202 may be analyzed to determine whether a natural join path exists between the two columns 200 and 202. Column 200 may be analyzed to form a cardinality estimate 220. The cardinality estimate 220 may comprise an indication of the overall cardinality of column 200. Similarly, cardinality estimate 222 may comprise an indication of the overall cardinality of column 202.

For example, in FIG. 2, column 200 may be said to have an overall cardinality of two and a cardinality of one within the "A-C" range of the alphabet, because fields 204, 206, and 210 share the same value of "A" and field 208 has a value of "X." Column 202 could be said to have an overall cardinality of three and a cardinality of two within the range of "A-C," because fields 212 and 218 share a value of "A," field 214 has a value of "B," and field 216 has a value of "Y." It will be appreciated that these examples are intended to be illustrative of general principles, and should not be construed as limiting the scope of the present disclosure. In applications of the techniques described herein, there may be a large number of field values and, potentially, high cardinality values and many ranges for which cardinalities may be calculated.

Based on the estimated cardinalities in respective ranges, such as the "A-C" range, embodiments may perform a join path determination 224 to identify a join path involving column 200 and column 202. A join path determination 224 may be based on an intersection of cardinality estimate representations. A join path determination 224 may also be based on a union of cardinality estimate representations, which may be based on the intersection via the inclusion-exclusion principle.

Figure 3:
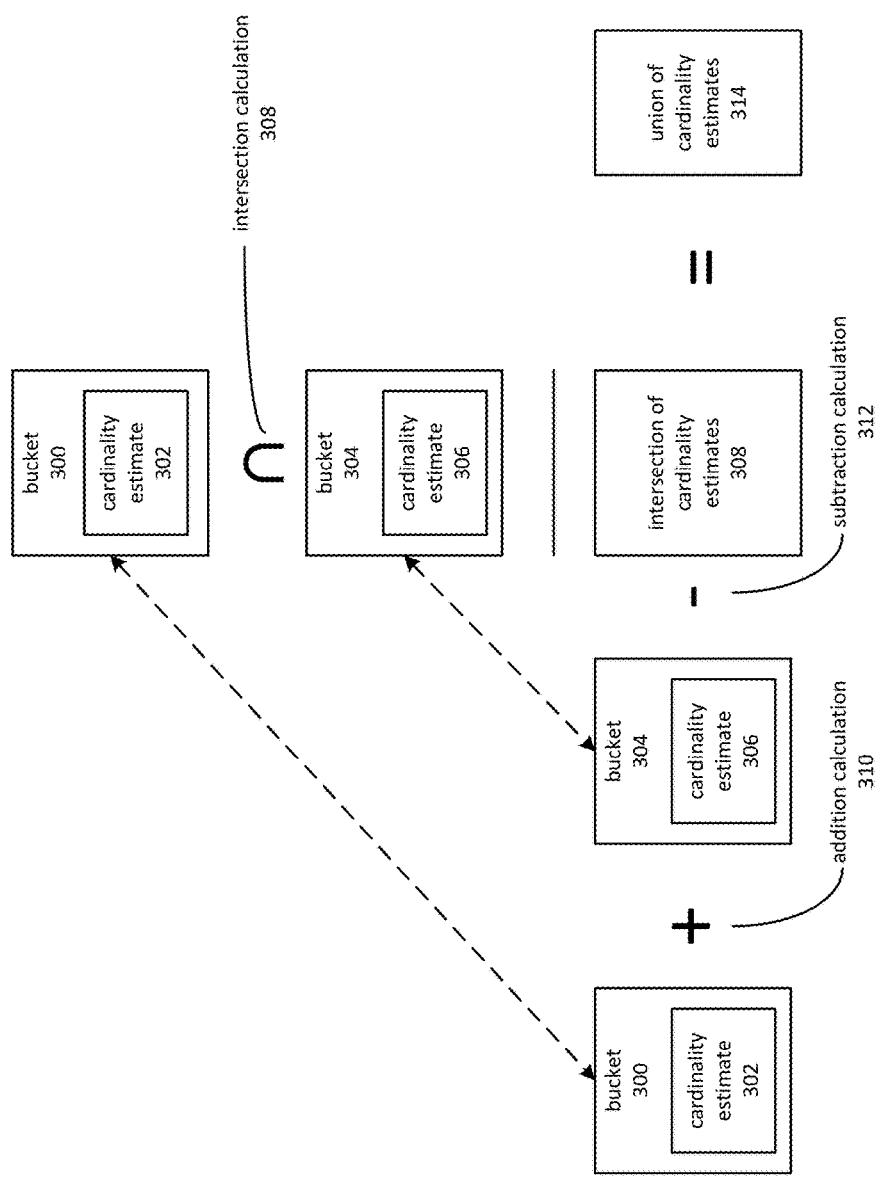
FIG. 3 depicts a process for calculating intersections and unions of probabilistic counting structures.

FIG. 3 depicts a process for calculating intersections and unions of probabilistic counting structures. A probabilistic counting structure may comprise various buckets, such as the depicted buckets 300 and 304. Each bucket may contain a representation of a cardinality estimate pertaining to that bucket. As depicted, cardinality estimate 302 may correspond to bucket 300 and cardinality estimate 306 may correspond to bucket 304. Note that because they are each utilized in two calculations, buckets 300 and 304 and corresponding cardinality estimates 302 and 306 are each depicted twice in FIG. 3.

An intersection of a probabilistic counting structure may comprise an intersection calculation 308. This may comprise an intersection between cardinality estimate 302 and cardinality estimate 306. The nature of the intersection calculation may depend in part on the representation of the cardinality estimate. In some cases, applications of set theory may be used to form an intersection or union of corresponding buckets. In other cases, set theory may be applied to the representation as a whole. In still other cases, examination of the buckets may support inferential means of calculating the intersection or union of two probabilistic counting structures. For example, in the case of the hyperloglog, an examination of the leading zeros in a binary representation of a hyperloglog bucket can be used in the determination of the intersection or union. In some embodiments, a bitwise-AND operation may be performed between the two cardinality representations. In FIG. 3, the resulting structure is depicted as an intersection of cardinality estimates 308. This may be subtracted by a subtraction calculation 312 from the sum of cardinality estimate 302 and cardinality estimate 306, which may be obtained through additional calculation 310. The nature of addition calculation 310 and subtraction calculation 312 may vary based on how the cardinality estimates are represented.

A result of subtracting the intersection of cardinality estimates 308 from the sum of cardinality estimates 302 and 206 may be a union of cardinality estimates 314. In various embodiments, a union of cardinality estimates 314 may represent a degree of overlap between values in two columns. Note that various embodiments may support analysis involving more than two columns, using the various techniques described herein.

Figure 4:
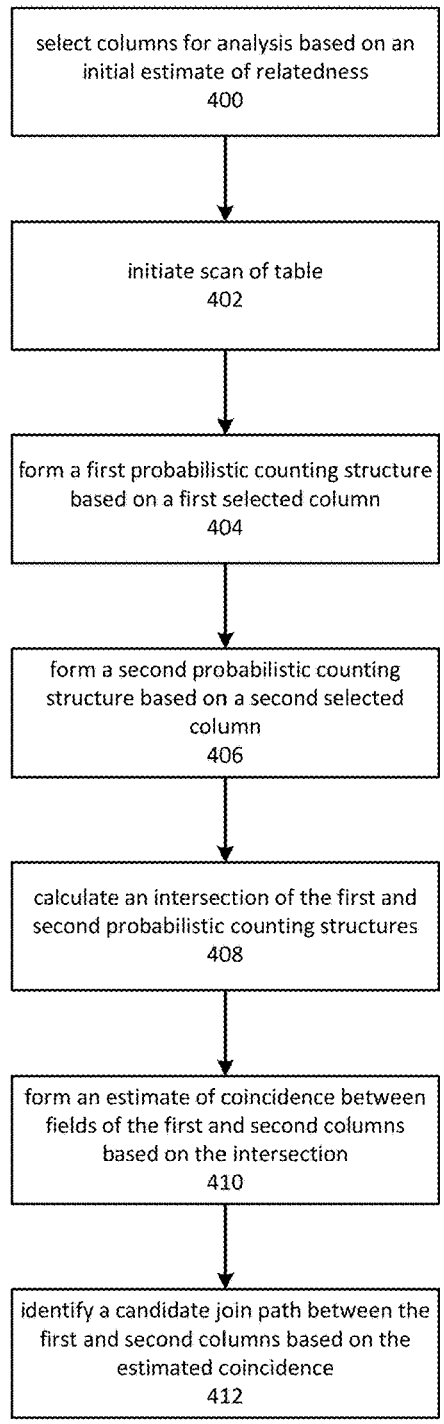
FIG. 4 depicts an embodiment of a process for identifying join paths using a probabilistic counting structure.

FIG. 4 depicts an embodiment of a process for identifying join paths using a probabilistic counting structure. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using modules comprising computer-executable instructions executed by a computing system, such as the computing systems described herein. Embodiments of the depicted process may, in some instances, be practiced in a distributed computing environment in which a table is hosted by a distributed database management system comprising a plurality of computing nodes. Analysis operations may be performed by a computing node that is communicatively coupled to the distributed database management system, and which includes an analysis module, such as the analysis module 146 depicted in FIG. 1.

As depicted by element 400, embodiments may select columns for analysis based on an initial estimate of relatedness. The initial estimate may comprise identifying columns of a table or data collection that have common data types. Embodiments may group columns of a table into tuples comprising columns of the same or similar type, or those that may be converted to the same or similar type. Initial estimates may also be based on a sampling of field values for the various columns of a row. In such cases, embodiments may generally avoid scanning the full table at this stage.

Embodiments may identify multiple tuples of columns for analysis. As depicted by element 402, embodiments may initiate a scan of the table. Embodiments may perform analysis on multiple tuples based on probabilistic counting structures constructed during a single scan. A table scan may in some cases and embodiments comprise a full table scan. In other cases and embodiments, a table scan may be partial. Various sampling techniques may be utilized to reduce the time or other costs associated with running a full table scan. In cases involving columnar storage, full or partial scans of relevant columns may be performed in order to form a probabilistic counting structure for each selected column.

Elements 404 and 406 depict an embodiment forming a first probabilistic counting structure for a first column, and a second probabilistic counting structure for a second column. The columns may correspond to columns selected by the operations depicted by element 400. The probabilistic counting structures may be a hyperloglog, loglog, bloom filter, min-hash, or other similar structures. Embodiments may be constructed to utilize a particular type of probabilistic counting structure based on factors such as memory efficiency, accuracy, and the feasibility of performing intersection and/or union operators on two or more of such structures.

Forming a hyperloglog structure for a column may comprise allocating memory for buckets of the hyperloglog structure. During the scan of the table, initiated at element 402, a hash function can be applied to the value of the first column for each row, and stored in a bucket corresponding to the output of the hash function. The resulting structure may represent a randomized distribution whose cardinality is correlative to the cardinality of the first column. Larger amounts of memory allocated for the buckets allows for a more granular hash function and greater accuracy for estimating cardinality. Other probabilistic counting structures may be formed in a similar manner. These structures may be formed in the memory of a computing device, or on a storage device to which the computing device is communicatively coupled. In some cases, such as with a hyperloglog, the amount of space allocated to the structure corresponds to the accuracy of the cardinality estimate it provides. Embodiments may, in some cases, form a hyperloglog or other probabilistic data structure based on balancing the factors of available memory or storage space and a desired level of accuracy for the estimate.

Element 408 depicts an embodiment calculating an intersection of the first and second probabilistic counting structures. An intersection of two probabilistic counting structures may comprise calculation of the intersections of corresponding buckets in the probabilistic counting structures. Embodiments may utilize the intersection to then calculate the union of the probabilistic counting structures. The intersection may be calculated using the procedure depicted in FIG. 3, for example.

As depicted by element 410, embodiments may form an estimate of coincidence between fields of the first and second columns. The estimate may be based on the intersection, on a union calculated based on the intersection, or on a determination of the number of elements not in the intersection. The estimate of field coincidence may be based on using the inclusion-exclusion principle to calculate the estimated cardinality of a set consisting of members of the first column that are also present in the second column. Alternatively, the estimate of field coincidence may be based on the cardinality of a set consisting of members of the first column that are not also present in the second column, as well as members of the second column that are not also present in the first column.

As depicted by element 412, embodiments may identify a candidate join path between the first and second columns based on the estimated coincidence. This may include determining that the degree of coincidence between values in the first and second columns is above a threshold, where the determination is based at least on the intersection or union of the first and second probabilistic data structures. A higher estimate of coincidence is indicative of a greater likelihood of a join path existing between the two columns. Accordingly, identification of a join path between two columns can be based on an estimate of coincidence being above a threshold value.

Figure 5:
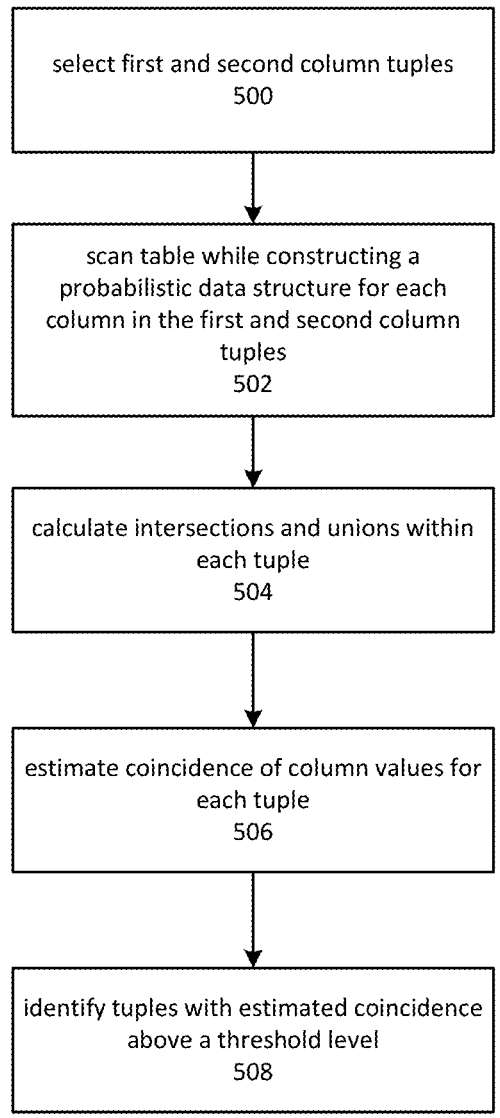
FIG. 5 depicts an embodiment of a process for identifying a join path between two of a plurality of columns.

FIG. 5 depicts an embodiment of a process for identifying a join path between two of a plurality of columns. Although depicted as a sequence of elements, those of ordinary skill in the art will appreciate that the depicted order should not be construed as limiting the scope of the present disclosure and that at least some of the depicted elements may be altered, omitted, reordered, supplemented with additional elements, or performed in parallel. Embodiments of the depicted process may be implemented using modules comprising computer-executable instructions executed by a computing system, such as the computing systems described herein.

As depicted by element 500, embodiments may select, from among a plurality of columns, at least a first column tuple and a second column tuple. A column tuple may comprise two columns selected for further evaluation as a potential join path. The tuples may be selected from among those columns that share the same or similar data types, or that may be converted to a common data type. The data type may be the basis of an initial estimate of relatedness. In some cases and embodiments, additional factors may include preliminary sampling of data in the column, analysis based on column names, and so on. Selecting the column tuples may comprise adding the tuples to a list structure held in the memory of a computing device. Tuples in the list may then be accessed for subsequent analysis.

Embodiments may, as depicted by element 502, scan a table (or otherwise process a data stream) while constructing a probabilistic data structure for each unique column in the tuples. For example, if the tuples are (column A, column B) and (column A, column C), then embodiments may form three probabilistic data structures—one for each of columns A, B, and C. As depicted by element 504, intersections may then be calculated between columns in each tuple. For example, an embodiment might calculate an intersection of the probabilistic data structure for column A with that of column B, and calculate the intersection of the probabilistic data structure for column A with that of column C. Scanning a table or otherwise processing a data stream can include a record-by-record inspection of the rows in the table or data in the stream. In some cases, a scan may be complete, i.e. involving the examination of every row in the table or element of the stream. In other cases, the scan may be partial, for example utilizing sampling or skipping techniques to inspect a subset of rows in the table or records in the stream.

As depicted by element 506, a degree of column value coincidence may be estimated for each tuple. In other words, column value coincidence may be estimated for columns A with respect to column B, and for column A with respect to column C. Those tuples whose estimated coincidence is the highest, or is above some threshold level, may be identified as join paths, as shown in element 508. FIG. 4 provides further detail regarding estimation of the degree of coincidence for the tuple and identification of the join path.

Embodiments may perform an initial scan while forming hyperloglogs or other probabilistic counting structures for a number of columns. The size of the structures may be limited by the embodiment in order to conform to various memory constraints. A second scan may then be performed, during which a smaller number of hyperloglogs or other probabilistic counting structures may be formed, for a smaller number of columns. The size of these structures may be increased relative to those formed during the first scan. This approach reduces memory required for the probabilistic counting structures formed in the first scan, and increases the accuracy of the structures formed during the second scan. The columns used in the second scan may those identified as promising based on the probabilistic counting structures formed during the first scan.

Embodiments of the present disclosure may be employed in conjunction with many types of database management systems ("DBMSs"). A DBMS is a software and hardware system for maintaining an organized collection of data on which storage and retrieval operations may be performed. In a DBMS, data is typically organized by associations between key values and additional data. The nature of the associations may be based on real-world relationships that exist in the collection of data, or it may be arbitrary. Various operations may be performed by a DBMS, including data definition, queries, updates, and administration. Some DBMSs provide for interaction with the database using query languages, such as structured query language ("SQL"), while others use APIs containing operations, such as put and get and so forth. Interaction with the database may also be based on various protocols or standards, such as hypertext markup language ("HTML") and extended markup language ("XML"). A DBMS may comprise various architectural components, such as a storage engine that acts to store data on one or more storage devices, such as solid-state drives.

Figure 6:
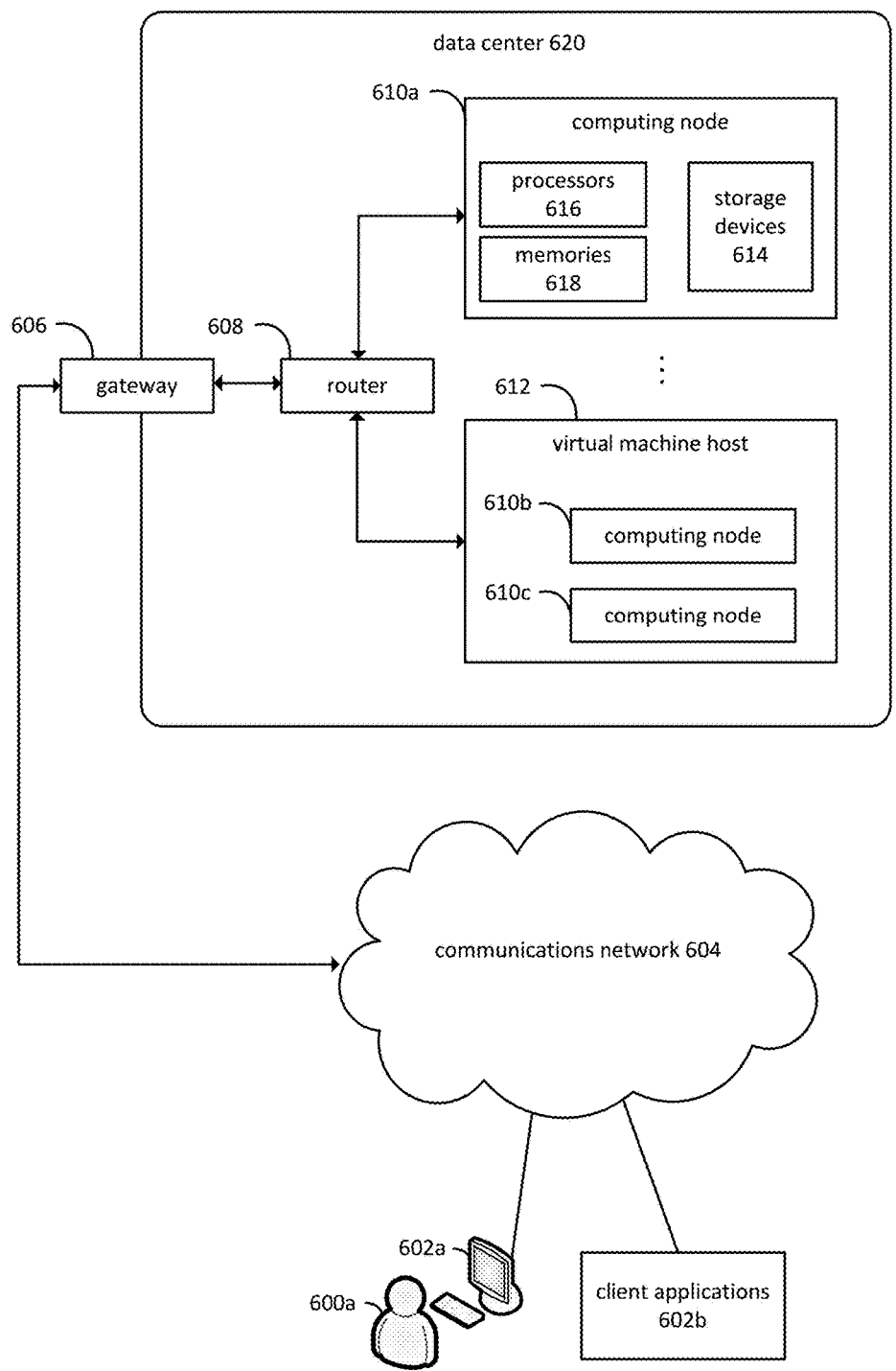
FIG. 6 is a block diagram depicting an embodiment of a computing environment in which aspects of the present disclosure may be practiced.

FIG. 6 is a diagram depicting an example of a distributed computing environment on which aspects of the present invention may be practiced. Various users 600*a* may interact with various client applications, operating on any type of computing device 602*a*, to communicate over communications network 604 with processes executing on various computing nodes 610*a*, 610*b*, and 610*c* within a data center 620. Alternatively, client applications 602*b* may communicate without user intervention. Communications network 604 may comprise any combination of communications technology, including the Internet, wired and wireless local area networks, fiber optic networks, satellite communications, and so forth. Any number of networking protocols may be employed.

Communication with processes executing on the computing nodes 610*a*, 610*b*, and 610*c*, operating within data center 620, may be provided via gateway 606 and router 608. Numerous other network configurations may also be employed. Although not explicitly depicted in FIG. 6, various authentication mechanisms, web service layers, business objects, or other intermediate layers may be provided to mediate communication with the processes executing on computing nodes 610*a*, 610*b*, and 610*c*. Some of these intermediate layers may themselves comprise processes executing on one or more of the computing nodes. Computing nodes 610*a*, 610*b*, and 610*c*, and processes executing thereon, may also communicate with each other via router 608. Alternatively, separate communication paths may be employed. In some embodiments, data center 620 may be configured to communicate with additional data centers, such that the computing nodes and processes executing thereon may communicate with computing nodes and processes operating within other data centers.

Computing node 610*a* is depicted as residing on physical hardware comprising one or more processors 616, one or more memories 618, and one or more storage devices 614. Processes on computing node 610*a* may execute in conjunction with an operating system or alternatively may execute as a bare-metal process that directly interacts with physical resources, such as processors 616, memories 618, or storage devices 614.

Computing nodes 610*b* and 610*c* are depicted as operating on virtual machine host 612, which may provide shared access to various physical resources, such as physical processors, memory, and storage devices. Any number of virtualization mechanisms might be employed to host the computing nodes.

The various computing nodes depicted in FIG. 6 may be configured to host web services, database management systems, business objects, monitoring and diagnostic facilities, and so forth. A computing node may refer to various types of computing resources, such as personal computers, servers, clustered computing devices, and so forth. A computing node may, for example, refer to various computing devices, such as cell phones, smartphones, tablets, embedded device, and so on. When implemented in hardware form, computing nodes are generally associated with one or more memories configured to store computer-readable instructions and one or more processors configured to read and execute the instructions. A hardware-based computing node may also comprise one or more storage devices, network interfaces, communications buses, user interface devices, and so forth. Computing nodes also encompass virtualized computing resources, such as virtual machines implemented with or without a hypervisor, virtualized bare-metal environments, and so forth. A virtualization-based computing node may have virtualized access to hardware resources as well as non-virtualized access. The computing node may be configured to execute an operating system as well as one or more application programs. In some embodiments, a computing node might also comprise bare-metal application programs.

Figure 7:
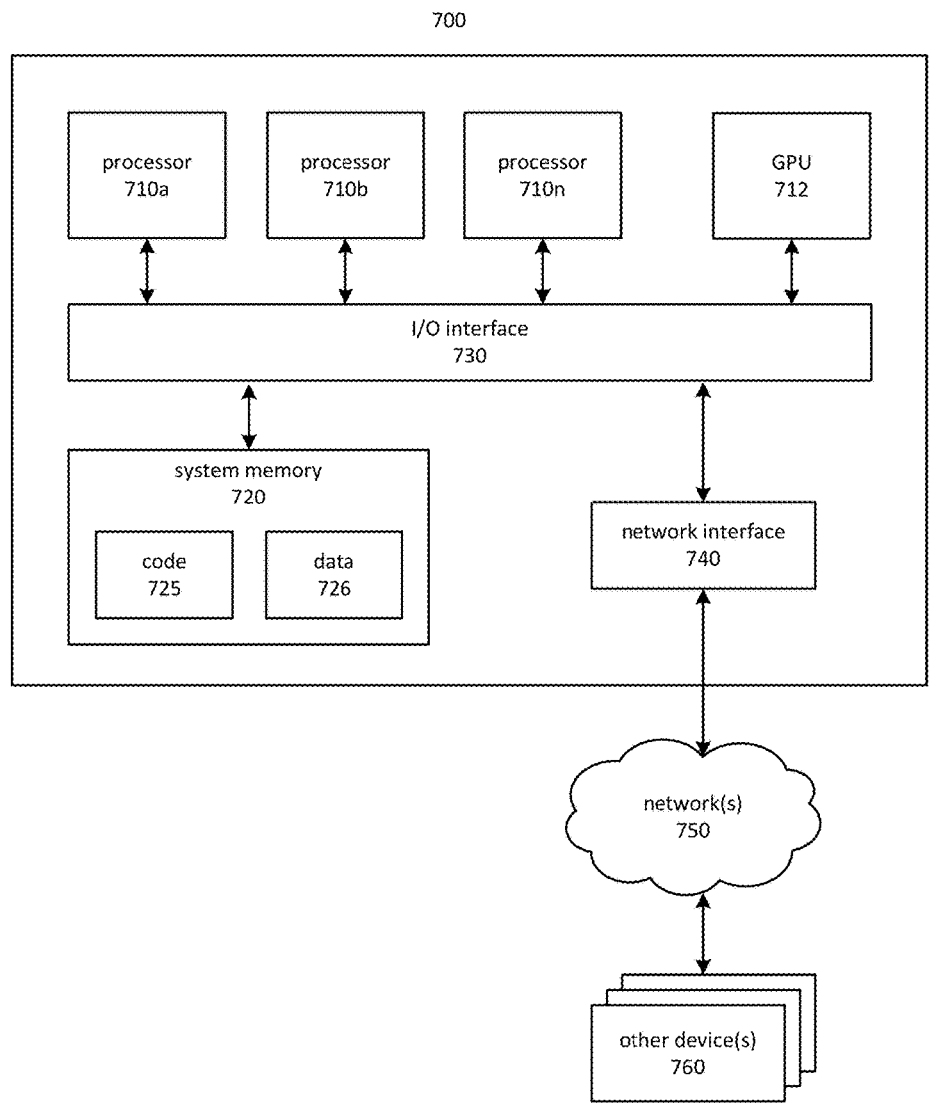
FIG. 7 is a block diagram depicting an embodiment of a computing system on which aspects of the present disclosure may be practiced.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. In the illustrated embodiment, computing device 700 includes one or more processors 710*a*, 710*b*, and/or 710*n* (which may be referred herein singularly as a processor 710 or in the plural as the processors 710) coupled to a system memory 720 via an input/output ("I/O") interface 730. Computing device 700 further includes a network interface 740 coupled to I/O interface 730.

In various embodiments, computing device 700 may be a uniprocessor system including one processor 710 or a multiprocessor system including several processors 710 (e.g., two, four, eight, or another suitable number). Processors 710 may be any suitable processors capable of executing instructions. For example, in various embodiments, processors 610 may be general-purpose or embedded processors implementing any of a variety of instruction set architectures ("ISAs"), such as the x86, PowerPC, SPARC, or MIPS ISAs or any other suitable ISA. In multiprocessor systems, each of processors 610 may commonly, but not necessarily, implement the same ISA.

In some embodiments, a graphics processing unit ("GPU") 712 may participate in providing graphics rendering and/or physics processing capabilities. A GPU may, for example, comprise a highly parallelized processor architecture specialized for graphical computations. In some embodiments, processors 710 and GPU 712 may be implemented as one or more of the same type of device.

System memory 720 may be configured to store instructions and data accessible by processor(s) 610. In various embodiments, system memory 720 may be implemented using any suitable memory technology, such as static random access memory ("SRAM"), synchronous dynamic RAM ("SDRAM"), nonvolatile/Flash®-type memory, or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor 710, system memory 720, and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 610). In some embodiments, I/O interface 730 may include support for devices attached through various types of peripheral buses, such as a variant of the Peripheral Component Interconnect (PCI) bus standard or the Universal Serial Bus ("USB") standard, for example. In some embodiments, the function of I/O interface 730 may be split into two or more separate components, such as a north bridge and a south bridge, for example. Also, in some embodiments some or all of the functionality of I/O interface 730, such as an interface to system memory 620, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 740 may support communication via telecommunications/telephony networks, such as analog voice networks or digital fiber communications networks, via storage area networks, such as Fibre Channel SANs (storage area networks), or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device 700 via I/O interface 730. A non-transitory computer-accessible storage medium may also include any volatile or non-volatile media, such as RAM (e.g., SDRAM, DDR SDRAM, RDRAM, SRAM, etc.), ROM, etc., that may be included in some embodiments of computing device 700 as system memory 720 or another type of memory. Further, a computer-accessible medium may include transmission media or signals, such as electrical, electromagnetic or digital signals, conveyed via a communication medium, such as a network and/or a wireless link, such as those that may be implemented via network interface 740. Portions or all of multiple computing devices, such as those illustrated in FIG. 7, may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as tablet computers, personal computers, smartphones, game consoles, commodity-hardware computers, virtual machines, web services, computing clusters, and computing appliances. Any of these computing devices or environments may, for convenience, be described as compute nodes or as computing nodes.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage capacity for storage, processing capability for processing, as instances, as sets of related services, and the like. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines ("JVMs"), general-purpose or special-purpose operating systems, platforms that support various interpreted or compiled programming languages—such as Ruby, Perl, Python, C, C++, and the like—or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems ("OS") and/or hypervisors, and with various installed software applications, runtimes, and the like. Instances may further be available in specific availability zones, representing a logical region, a fault tolerant region, a data center, or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems and data structures may also be stored (e.g., as software instructions or structured data) on a computer-readable medium, such as a hard disk, a memory, a network, or a portable media article to be read by an appropriate device or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for identifying analytical relationships in transactional data, the system comprising:
one or more computing nodes maintaining a table comprising a plurality of rows;
one or more memories having stored thereon computer-readable instructions that, upon execution by a computing device, cause the system at least to:
select a first column and a second column of the plurality of rows, wherein the first and second columns are selected based at least in part on a first estimate of relatedness between the first and second columns;
form a first hyperloglog based at least in part on a first plurality of fields in the plurality of rows, the first plurality of fields corresponding to the first column;
form a second hyperloglog based at least in part on a second plurality of fields in the plurality of rows, the second plurality of fields corresponding to the second column;
calculate an intersection of the first hyperloglog and the second hyperloglog; and
identify a join path between the first column and the second column based at least in part on a second estimate of coincidence between fields of the first plurality of fields and fields of the second plurality of fields, the second estimate based at least in part on the intersection.

2. The system of claim 1, further comprising one or more memories having stored thereon computer-readable instructions that, upon execution by the one or more computing nodes, cause the system at least to:
form the first estimate of relatedness based on a data type common to the first column and the second column.

3. The system of claim 1, further comprising one or more memories having stored thereon computer-readable instructions that, upon execution by the one or more computing nodes, cause the system at least to:
identify the join path by at least comparing the second estimate of coincidence for the first and second columns to an additional estimate of coincidence for two or more additional columns.

4. The system of claim 1, further comprising one or more memories having stored thereon computer-readable instructions that, upon execution by the one or more computing nodes, cause the system at least to:
form the second estimate of coincidence by at least subtracting the intersection of the first hyperloglog and the second hyperloglog from a union of the first hyperloglog and the second hyperloglog.

5. The system of claim 1, further comprising one or more memories having stored thereon computer-readable instructions that, upon execution by the one or more computing nodes, cause the system at least to:
form a plurality of hyperloglogs by at least performing a first scan of the plurality of rows; and
form the first hyperloglog by at least performing a second scan of the plurality of rows, wherein a size of the first hyperloglog is greater than sizes of hyperloglogs in the plurality of hyperloglogs formed during the first scan.

6. A non-transitory computer-readable storage medium having stored thereon instructions that, upon execution by one or more computing devices, cause the one or more computing devices at least to:
form a first probabilistic counting structure based at least in part on a first plurality of fields in a plurality of rows, the first plurality of fields corresponding to a first column of the plurality of rows;
form a second probabilistic counting structure based at least in part on a second plurality of fields in the plurality of rows, the second plurality of fields corresponding to a second column of the plurality of rows;
calculate an intersection of the first and second probabilistic counting structures; and
identify a join path between the first column and the second column based at least in part on an estimate of coincidence between fields of the first plurality of fields and fields of the second plurality of fields, the estimate of coincidence based at least in part on the intersection.

7. The non-transitory computer-readable storage medium of claim 6, comprising further instructions that, upon execution by the one or more computing devices, cause the one or more computing devices to at least:
select the first column and the second column for forming the first and second probabilistic counting structures based at least in part on a data type common to the first and second columns.

8. The non-transitory computer-readable storage medium of claim 6, comprising further instructions that, upon execution by the one or more computing devices, cause the one or more computing devices to at least:

identify the join path by at least comparing the estimate of coincidence for the first and second columns to an additional estimate of coincidence for two or more additional columns.

9. The non-transitory computer-readable storage medium of claim 6, comprising further instructions that, upon execution by the one or more computing devices, cause the one or more computing devices to at least:
form the estimate of coincidence by at least subtracting the intersection of the first and second probabilistic counting structures from a union of the first and second probabilistic counting structures.

10. The non-transitory computer-readable storage medium of claim 6, wherein the estimate of coincidence is based at least in part on a count of fields not included in the intersection.

11. The non-transitory computer-readable storage medium of claim 6, comprising further instructions that, upon execution by the one or more computing devices, cause the one or more computing devices to at least:
form the first probabilistic counting structure by at least performing a first scan of the plurality of rows and a second scan of the plurality of rows, wherein a size of the first probabilistic counting structure is increased for the second scan.

12. The non-transitory computer-readable storage medium of claim 6, comprising further instructions that, upon execution by the one or more computing devices, cause the one or more computing devices to at least:
calculate the intersection by at least combining corresponding buckets in the first and second probabilistic counting structures.

13. The non-transitory computer-readable storage medium of claim 6, wherein the probabilistic counting structure comprises at least one of a loglog, a hyperloglog, a bloom filter, or a min-hash.

14. A computer-implemented method for identifying analytical relationships in transactional data, the method comprising:
forming, in a memory of a computing device, a first probabilistic counting structure based at least in part on scanning a first plurality of fields corresponding to a first column, the first plurality of fields stored on a one or more storage devices communicatively coupled to the computing device;
forming, in the memory of the computing device, a second probabilistic counting structure based at least in part on a second plurality of fields corresponding to a second column, the second plurality of fields stored on the one or more storage devices;
calculating an intersection of the first and second probabilistic counting structures; and
identifying a join path between the first column and the second column based at least in part on an estimate of coincidence between fields of the first plurality of fields and fields of the second plurality of fields, the estimate of coincidence based at least in part on the intersection.

15. The computer-implemented method of claim 14, further comprising:
selecting the first column and the second column for forming the first and second probabilistic counting structures based at least in part on a data type common to the first and second columns.

16. The computer-implemented method of claim 14, further comprising:
identifying the join path by at least comparing the estimate of coincidence for the first and second columns to an additional estimate of coincidence for two or more additional columns.

17. The computer-implemented method of claim 14, further comprising:
forming the estimate of coincidence by subtracting the intersection of the first and second probabilistic counting structures from a union of the first and second probabilistic counting structures.

18. The computer-implemented method of claim 14, wherein the estimate of coincidence is based at least in part on a probabilistically determined count of fields not included in the intersection.

19. The computer-implemented method of claim 14, further comprising:
forming a hierarchy based at least in part on the identified join path.

20. The computer-implemented method of claim 14, further comprising:
calculating the intersection by at least combining corresponding buckets in the first and second probabilistic counting structures.

* * * * *